United States Patent
Christiaens et al.

(10) Patent No.: US 9,483,486 B1
(45) Date of Patent: Nov. 1, 2016

(54) DATA ENCRYPTION FOR A SEGMENT-BASED SINGLE INSTANCE FILE STORAGE SYSTEM

(75) Inventors: Mark Germain Jules Christiaens, Aalter (BE); Bastiaan Stougie, Melle (BE); Tom De Coninck, Ghent (BE); Charles Barry Noble, Lake Mary, FL (US)

(73) Assignee: VERITAS TECHNOLOGIES LLC, Mountain View, CA (US)

( * ) Notice: Subject to any disclaimer, the term of this patent is extended or adjusted under 35 U.S.C. 154(b) by 1924 days.

(21) Appl. No.: 12/346,112

(22) Filed: Dec. 30, 2008

(51) Int. Cl.
*G06F 11/30* (2006.01)
*G06F 17/30* (2006.01)
*G06F 3/06* (2006.01)

(52) U.S. Cl.
CPC ....... *G06F 17/30156* (2013.01); *G06F 3/0641* (2013.01)

(58) Field of Classification Search
CPC .................. G06F 17/30156; G06F 3/0641
USPC ........................................................ 713/193
See application file for complete search history.

(56) References Cited

U.S. PATENT DOCUMENTS

| 7,373,520 | B1 | 5/2008 | Borthakur | |
|---|---|---|---|---|
| 7,454,592 | B1 | 11/2008 | Shah | |
| 7,478,113 | B1 | 1/2009 | De Spiegeleer | |
| 7,814,149 | B1 * | 10/2010 | Stringham | 709/203 |
| 2008/0098236 | A1 * | 4/2008 | Pandey et al. | 713/189 |
| 2008/0243878 | A1 * | 10/2008 | de Spiegeleer et al. | 707/100 |
| 2009/0132616 | A1 * | 5/2009 | Winter et al. | 707/204 |
| 2009/0265399 | A1 * | 10/2009 | Cannon et al. | 707/205 |
| 2010/0036872 | A1 * | 2/2010 | Hiraiwa et al. | 707/103 R |
| 2010/0082700 | A1 * | 4/2010 | Parab | 707/803 |
| 2010/0083003 | A1 * | 4/2010 | Spackman | 713/193 |

OTHER PUBLICATIONS

Dejun Wang, Lina Wang, Jingbo Song, "SEDBRS: A Secure and Efficient Desktop Backup and Recovery System" Pub Date: Dec. 12, 2007.*
"Pastiche: Making Backup Cheap and Easy," Cox et al., ACM SIGOPS Operating Systems Review, vol. 36, Issue SI (Winter 2002), pp. 285-298.
"Tahoe—The Least-Authority Filesystem," Wilcox-O'Hearn et al., Conference on Computer and Communications Security, Proceedings of the 4th ACM international workshop on Storage security and survivability, Alexandria, Virginia, USA, 2008, pp. 21-26.

* cited by examiner

*Primary Examiner* — Krista Zele
*Assistant Examiner* — James Forman
(74) *Attorney, Agent, or Firm* — Meyertons, Hood, Kivlin, Kowert & Goetzel, P.C.

(57) ABSTRACT

Various embodiments of a system and method for backing up a plurality of copies of a file are described. A first copy of the file may be owned by a first user, and a second copy of the file may be owned by a second user. The file is split into a plurality of segments, and each segment is encrypted with a respective segment key. Each encrypted segment is transmitted to and stored on a server computer system. De-duplication techniques are used to ensure that only a single instance of each encrypted segment is stored. The segment keys used to encrypt the file segments are also stored on the server computer system in an encrypted form. De-duplication techniques may be utilized so that only a single instance of the encrypted segment keys is stored.

8 Claims, 12 Drawing Sheets

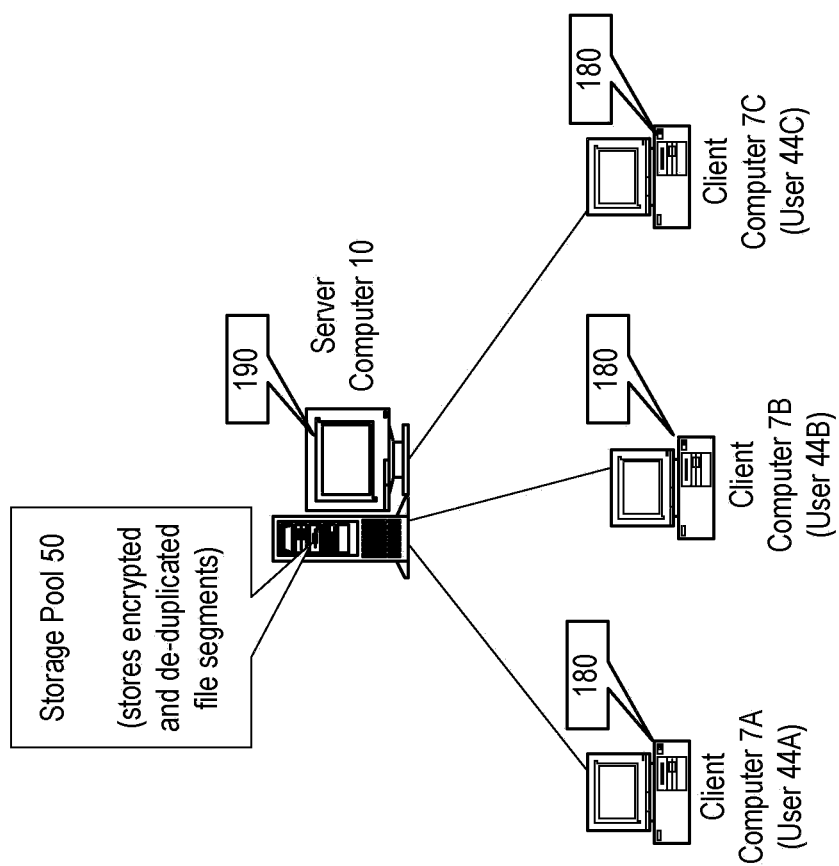

DATA ENCRYPTION FOR A SEGMENT-BASED SINGLE INSTANCE FILE STORAGE SYSTEM

BACKGROUND OF THE INVENTION

Field of the Invention

This invention relates to the field of computer data storage. More particularly, the invention relates to a system and method using de-duplication and encryption techniques to store files for a plurality of users in a file storage pool on a server computer system.

Description of the Related Art

Computer systems generally store information as files organized by a file system. Each file may be stored on a storage device, such as a disk drive, optical drive, or tape drive. It is often necessary to back up files by copying them to another storage device. For example, backup operations may be performed to guard against hardware failure or data loss, to provide a snapshot of files at a particular point in time, or to replicate files for other purposes.

In a networked computing environment, a plurality of client computer systems may each back up files to a backup server computer system. It is possible that an identical file is stored on multiple client computer systems. For example, two or more client computer systems may each store a copy of a file, where the data in each copy is identical. For example, client computer systems that execute the same operating system or the same software applications often have many identical files.

De-duplication techniques can be utilized so that only a single copy of each file is stored on the backup server computer system. For example, for each client computer system that has a copy of a particular file, the backup server computer system may store respective file metadata representing that copy. The portions of file metadata associated with each respective copy of the file may all reference a single instance of the file data (the actual contents of the file). In this way, the backup system can avoid the need to store multiple copies of identical files on the backup server computer system. A storage system which uses de-duplication to store and reference a single instance of data in order to avoid storing multiple copies of identical data is generally referred to as a single instance storage system.

It is sometimes desirable to store the files on the backup server computer system in encrypted form, e.g., to prevent unauthorized use of the files. An encryption algorithm typically uses a key (e.g., information such as a series of bits) to transform the file data into an encoded form. Thus, for example, each client computer may have its own key which is used to encrypt its files before transmitting them to the backup server computer system so that the files received from each client computer are unreadable by any user or application who does not possess the client computer's particular key.

However, since the process of encrypting a file involves transforming the file data into an encoded form that depends upon the encryption key that is used, different copies of an identical file encrypted by different client computers will produce different encrypted data since the encryption keys for the client computers are different from each other. This is a problem for single instance storage systems because even though the original file data is identical, the resulting encrypted data produced by the different client computers is not identical.

SUMMARY

Various embodiments of a system and method for backing up a plurality of copies of a file to a server computer system are described herein. For example, a first copy of the file may be owned by or associated with a first user, and a second copy of the file may be owned by or associated with a second user. According to some embodiments of the method, the file may be split into a plurality of segments, and each segment may be encrypted with a respective segment key. In some embodiments the respective segment key used to encrypt each segment may be derived based on the unencrypted contents of the segment. Each encrypted segment may be transmitted to a server computer system for storage on the server computer system.

The method may further comprise storing information corresponding to the first copy of the file on the server computer system. The information corresponding to the first copy of the file may include information specifying each stored encrypted segment of the plurality of encrypted segments, and may also include a first encrypted aggregation of the segment keys for the plurality of encrypted segments. The first encrypted aggregation may be encrypted with a private key of the first user.

The method may further comprise storing information corresponding to the second copy of the file on the server computer system. The information corresponding to the second copy of the file may include information specifying each stored encrypted segment of the plurality of encrypted segments, and may also include a second encrypted aggregation of the segment keys for the plurality of encrypted segments. The second encrypted aggregation may be encrypted with a private key of the second user.

In an alternative embodiment of the method, the plurality of encrypted segments may be stored on the server computer system, and a single encrypted aggregation of the segment keys for the plurality of encrypted segments may be stored on the server computer system. The encrypted aggregation of the segment keys may be encrypted with a key K, where the key K is derived from the unencrypted aggregation of the segment keys. In this embodiment, the method may comprise storing information corresponding to the first copy of the file on the server computer system, where the information corresponding to the first copy of the file includes: 1) information specifying each stored encrypted segment of the plurality of encrypted segments; 2) information specifying the stored encrypted aggregation of the segment keys for the plurality of encrypted segments; and 3) a first encrypted version of the key K encrypted with a private key of the first user. The method may further comprise storing information corresponding to the second copy of the file on the server computer system, where the information corresponding to the second copy of the file includes: 1) information specifying each stored encrypted segment of the plurality of encrypted segments; 2) information specifying the stored encrypted aggregation of the segment keys for the plurality of encrypted segments; and 3) a second encrypted version of the key K encrypted with a private key of the second user.

BRIEF DESCRIPTION OF THE DRAWINGS

A better understanding of the invention can be obtained when the following detailed description is considered in conjunction with the following drawings, in which:

FIG. 1A illustrates one embodiment of a system including a plurality of client computer systems coupled to a server computer system, where the client computer systems are configured to backup files to a storage pool implemented by the server computer system;

Figure 1B:
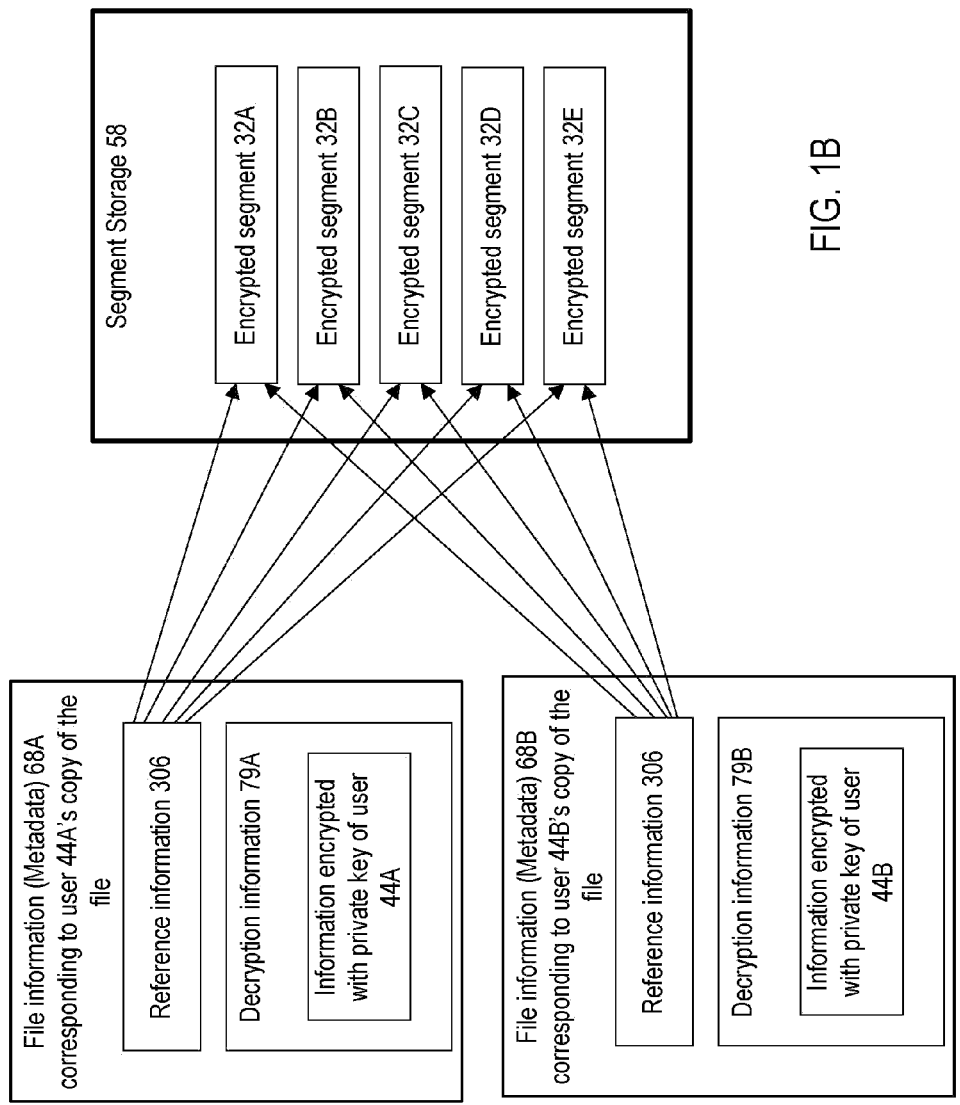
FIG. 1B illustrates an example of the storage pool according to one embodiment.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for backing up files to or storing files on a server computer system are described herein. The server computer system may receive files from a plurality of client computers, e.g., where the plurality of client computers are associated with or used by a plurality of users. The server computer system may store the files in a storage pool on behalf of the users. The system and method may operate to store the files in the storage pool in an encrypted form, while still maintaining single instance storage properties such that if different users each have their own copy of a particular file, the server computer system only stores a single instance of the data of the particular file, e.g., as opposed to storing multiple copies. More particularly, the files stored on the server computer system may be split into a plurality of segments, where each segment is encrypted, and where only a single instance of each segment is stored.

FIG. 1A illustrates one embodiment of the system. The system includes a plurality of client computer systems 7. Although three client computer systems 7A-7C are shown in this example, in other embodiments there may be any number of client computer systems 7. Each client computer system 7 may include one or more storage devices on which one or more files are stored. Each file may be associated with or owned by a particular user 44. In some embodiments each user 44 may be a particular person. In other embodiments a user 44 may be an entity other than a person. For example, in some embodiments a user 44 may be a company or organization. In other embodiments a user 44 may be a particular software application. In general, a user may be any entity on whose behalf the server computer system 10 is configured to backup files, or any entity with which the server computer system 10 is configured to associate stored files.

In the example of FIG. 1A, each client computer 7 is associated with a particular user 44. For example, the client computer 7A may be used by a user 44A, the client computer 7B may be used by a user 44B, and the client computer 7C may be used by a user 44C. In other embodiments there may not be a one-to-one correspondence between client computers 7 and users 44. For example, in some embodiments a particular user 44 may use multiple client computers 7, and different ones of the user's files may be stored on different client computers 7. In other embodiments a particular client computer 7 may be shared by multiple users 44 such that the particular client computer 7 stores files for different users 44.

The system also includes a server computer system 10. Backup client software 180 executing on the client computers system 7 may communicate with backup server software 190 executing on the server computer system 10 to transmit the files associated with or owned by the users 44 to the server computer system 10 for storage in a storage pool 50. For example, in some embodiments the server computer system 10 may be a backup server computer system configured to backup the files on behalf of the users 44, e.g., to protect the files against hardware failure or data loss, to save a snapshot of the files at a particular point in time, and/or to replicate the files for other purposes. The storage pool 50 is a storage area or database implemented using storage space of one or more storage devices included in or coupled to the server computer system 10.

The backup client software 180 on the client computer systems 7 may be configured to split the files into segments before transmitting them to the server computer system 10. The backup client software 180 may also encrypt the segments before transmitting them to the server computer system 10. Thus, a particular file may be transmitted from one or more client computer systems 7 to the server computer system 10 by transmitting the encrypted segments of the particular file.

Suppose now that two different users 44A and 44B each own an identical copy of a particular file, e.g., where one copy is stored on a client computer 7A used by the user 44A, and the other copy is stored on a client computer 7B used by the user 44B. (The copies are said to be identical if the data contents of each copy are the same, although the file metadata or file system attributes of the two copies, such as their respective creation times, their pathnames, etc., may differ.) The two copies of the file may be backed up to the server computer system 10 in such a way that data segments of the file are stored in an encrypted form, and also such that only a single copy of each encrypted data segment is stored in the storage pool 50 on the server computer system 10.

For example, suppose that the copy of the file on the client computer 7A is first backed up to the server computer system 10. The backup client software 180 executing on the client computer 7A may split the file into a plurality of segments and encrypt each segment. The backup client software 180 may communicate with the backup server software 190 executing on the server computer system 10 to determine whether the encrypted segments are already stored on the server computer system 10. Any encrypted segments not yet stored on the server computer system 10 may be transmitted to the server computer system 10 for storage.

In addition the backup client software 180 may also transmit to the server computer system 10 decryption information useable to decrypt the encrypted segments of the file. The decryption information may include information encrypted with a private key of the user 44A, e.g., such that the private key of the user 44A is necessary in order to use the decryption information to decrypt the encrypted segments of the file. The private key of the user 44A is an encryption key which is kept private by the user 44A and is not known by other users 44 or other software programs not controlled or authorized by the user 44A. Thus, other users 44 or other software programs not controlled by the user 44A may not be able to use the decryption information to decrypt the encrypted segments of the file since they do not have the private key of the user 44A.

It is noted that the private key of the user 44A may be a key used by either a symmetrical encryption scheme or an asymmetrical encryption scheme. The term "private key" is often used in the context of an asymmetrical encryption scheme. An asymmetrical encryption scheme uses a pair of keys: a private key and a public key. The public key is primarily used to encrypt data and is typically publicly known. The public key cannot be used to decrypt the data that was encrypted using the public key. The private key is used to decrypt the data encrypted with the corresponding public key and is known to just one party. Thus, in some embodiments the private key of the user 44A may be the private key in a public/private key pair used in an asymmetrical encryption scheme, e.g., where the private key is known only by the user 44A. In other embodiments the private key of the user 44A may be a key used in a symmetrical encryption scheme, where the same key is used to both encrypt data and decrypt the encrypted data, and again where the private key is known only by the user 44A.

The backup client software 180 executing on the client computer system 7B may subsequently backup the copy of the file owned by the user 44B in a similar manner. For example the backup client software 180 executing on the client computer system 7B may split the file into a plurality of segments and encrypt each segment so as to produce identical encrypted segments as those produced by the backup client software 180 executing on the client computer system 7A. In this case, the backup client software 180 executing on the client computer system 7B may determine from the server computer system 10 that all of the encrypted segments are already stored on the server computer system 10, and thus, the backup client software 180 executing on the client computer system 7B may not transmit any of the encrypted segments to the server computer system 10.

The backup client software 180 executing on the client computer system 7B may transmit to the server computer system 10 decryption information useable to decrypt the encrypted segments of the file. In this case, however, the decryption information transmitted by the backup client software 180 executing on the client computer system 7B may include information encrypted with the private key of the user 44B instead of the user 44A. Thus, other users 44 or other software programs not authorized by the user 44B may not be able to use the decryption information transmitted by the backup client software 180 executing on the client computer system 7B to decrypt the encrypted segments of the file since they do not have the private key of the user 44B.

In response to the information received from the client computer systems 7A and 7B when the respective copies of the file are backed up, backup server software 190 executing on the server computer system 10 may store information in a storage pool 50 which represents the respective copies of the file. For example, FIG. 1B illustrates an example of the storage pool 50 according to one embodiment. In this example, the storage pool 50 includes a segment storage area or database 58 in which the backup server software has stored the encrypted segments of the file, e.g., the encrypted segments 32A-32E in this example.

The backup server software has also stored file information 68A corresponding to the user 44A's copy of the file and file information 68B corresponding to the user 44B's copy of the file. The file information 68 for a given copy of a file is also referred to herein as "metadata". The metadata 68 corresponding to each respective copy of the file may indicate which user owns the respective copy of the file. For example, the metadata 68A may specify the user 44A as the user who owns the particular copy of the file to which the metadata 68A corresponds. In another embodiment the backup server software may, for example, store the metadata 68A in a respective file information storage area or database corresponding to the user 44A in order to indicate that the user 44A owns the respective copy of the file.

Both the metadata 68A and 68B in this example include reference information 306 which specifies or references the encrypted segments 32A-32E, e.g., in order to identify which encrypted segments contain the data for the file. The reference information 306 may specify or reference the encrypted segments of the file either directly or indirectly in any of various ways. For example, in some embodiments each encrypted segment may have a corresponding name or ID, or other information that uniquely identifies the encrypted segment, and the reference information 306 may directly specify the IDs of the encrypted segments of the file. In other embodiments the reference information 306 or metadata 68 may indirectly specify the encrypted segments of the file by directly specifying one or more objects, where the objects then directly specify the encrypted segments of the file. Also, there may be multiple levels of indirection in some embodiments. For example, in some embodiments the reference information 306 may directly specify a first one or more objects, where the first one or more objects then specify a second one or more objects, and where the second one or more objects then specify the encrypted segments of the file (or where the second one or more objects then specify a third one or more objects that specify the encrypted segments of the file, etc.)

The metadata 68A includes decryption information 79A, e.g., the decryption information received from the client computer system 7A. As noted above, the decryption information 79A includes information encrypted with the private key of the user 44A. Similarly, the metadata 68B includes decryption information 79B, e.g., the decryption information received from the client computer system 7B, which includes information encrypted with the private key of the user 44B. Thus, the decryption information 79A may be used to decrypt the encrypted segments of the file, but only if the private key of the user 44A is known. This may prevent users other than the user 44A (or software programs which do not execute with authorization of the user 44A) from decrypting the encrypted segments of the file using the decryption information 79A. Similarly, the decryption information 79B may be used to decrypt the encrypted segments of the file, but only if the private key of the user 44B is known.

In some embodiments the respective metadata 68 for a respective copy of the file may also specify various other attributes of the copy of the file, e.g., file system attributes specifying properties of the copy of the file on the respective client computer 7 from which the copy of the file originated, such as the file's pathname, creation time, last modification time, etc.

Thus, for each copy of a file backed up to or stored on the server computer system 10 from a respective client computer 7, the server computer system 10 may store respective metadata 68 for the copy of the file in the storage pool 50. If different client computer systems 7 each backup respective copies of the same file then only a single instance of the encrypted file segments containing the file's data are stored in the storage pool 50, and the metadata entries corresponding to the various copies of the file all reference the same encrypted file segments.

Figure 2:
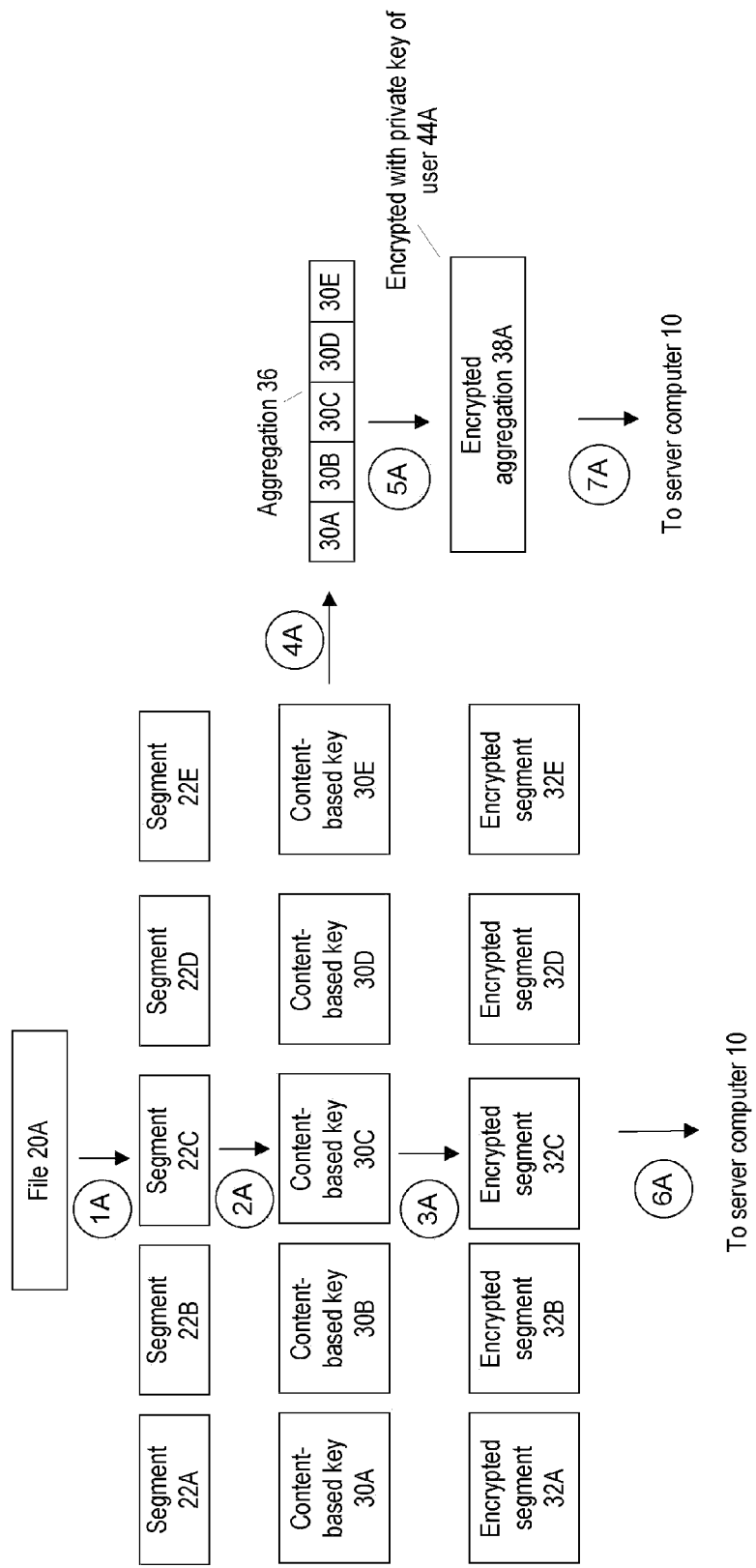
FIG. 2 illustrates one embodiment of an algorithm for backing up a file from a client computer system to the server computer system.

Referring now to FIG. 2, a detailed embodiment of an algorithm for backing up a particular file 20A owned by or associated with a user 44A is illustrated. The file 20A may originally be stored on a particular client computer system 7A. The algorithm may be implemented by software, e.g., backup client software 180, executing on the client computer system 7A.

As indicated by arrow 1A, the backup client software 180 may split the file 20A into a plurality of segments 22. In this example, the file 20A is split into five segments 22A-22E. In some embodiments each segment may be a fixed size, such as 128 kb or another fixed size of N bytes. Thus, for example, the segment 22A may include the first N bytes of the file 20A's data, the segment 22B may include the next N bytes of the file 20A's data, and so on. In other embodiments the segments 22 may be created in any of various other ways. Also, in some alternative embodiments the segments 22 may vary in size. For example, in some embodiments the backup client software 180 may analyze the file data to identify where each segment of the file should begin and end.

In some embodiments the file may be split into segments 22 by creating one or more data structures representing each segment 22. For example, in some embodiments the portion of the file data corresponding to each segment 22 may be copied into a respective data structure. In other embodiments, splitting the file may comprise creating information indicating where each segment 22 begins and ends, but the file data may not necessarily be copied into other data structures.

As indicated by arrow 2A, the backup client software may generate a respective content-based key 30 for each of the segments 22. The content-based key 30 for each segment 22 is an encryption key that will be used to encrypt the segment 22, where the key is derived from the contents (data) of the segment 22. For example, the content-based key 30A is derived using the data of the segment 22A, the content-based key 30B is derived using the data of the segment 22B, etc. In various embodiments the content-based keys 30 may include any information useable by an encryption algorithm to encrypt the segments 22. In a typical embodiment, a content-based key 30 may be a series of bits, such as a 64-bit key, or a 128-bit key, etc.

In various embodiments any desired algorithm operable to generate the content-based keys 30 based on the data of the respective segments 22 may be used. For example, the content-based key 30 for a particular segment 22 may be generated by using the data of the segment 22 to perform one or more mathematical functions or calculations. The key generation algorithm is an algorithm that will generate the same content-based key 30 every time for a given segment 22 as long as the data for the segment 22 remains the same.

As indicated by the arrow 3A, the backup client software may encrypt each segment 22 using the respective content-based key 30 for the segment 22, i.e., using the key derived from the data of the respective segment 22. For example, the segment 22A may be encrypted using the content-based key 30A, the segment 22B may be encrypted using the content-based key 30B, etc. Thus, each segment 22 is encrypted into a respective encrypted segment 32, as illustrated in FIG. 2.

As indicated by the arrow 4A, the backup client software may also aggregate the content-based keys 30 to produce an aggregation 36. The aggregation 36 is information that includes each of the content-based keys 30. In various embodiments the aggregation may be produced using any of various techniques, and the aggregation may be structured in any of various ways or may be represented using any type of data structure. In some embodiments the aggregation may be produced by concatenating the content-based keys 30, e.g., by appending the bits of the respective keys 30 to produce a single series of bits that includes all the bits of the individual keys 30. In other embodiments the backup client software may produce an aggregation of the content-based keys 30 in any of various ways other than concatenation.

As indicated by the arrow 5A, the backup client software may then encrypt the aggregation 36 using the private key of the user 44A to produce an encrypted aggregation 38A. Other users 44 or other software programs not controlled by or authorized by the user 44A may not be able to decrypt the encrypted aggregation 38A since they do not have the private key of the user 44A.

As indicated by the arrows 6A and 7A, the backup client software 180 executing on the client computer system 7A may communicate with backup server software 190 executing on the server computer system 10 to transmit the encrypted segments 32 and the encrypted aggregation 38A to the server computer system 10. The backup client software 180 may also transmit other file attributes regarding the file 20A to the server computer system 10, e.g., file system attributes of the file 20A, such as its pathname, creation time, last modification time, etc.

Figure 3:
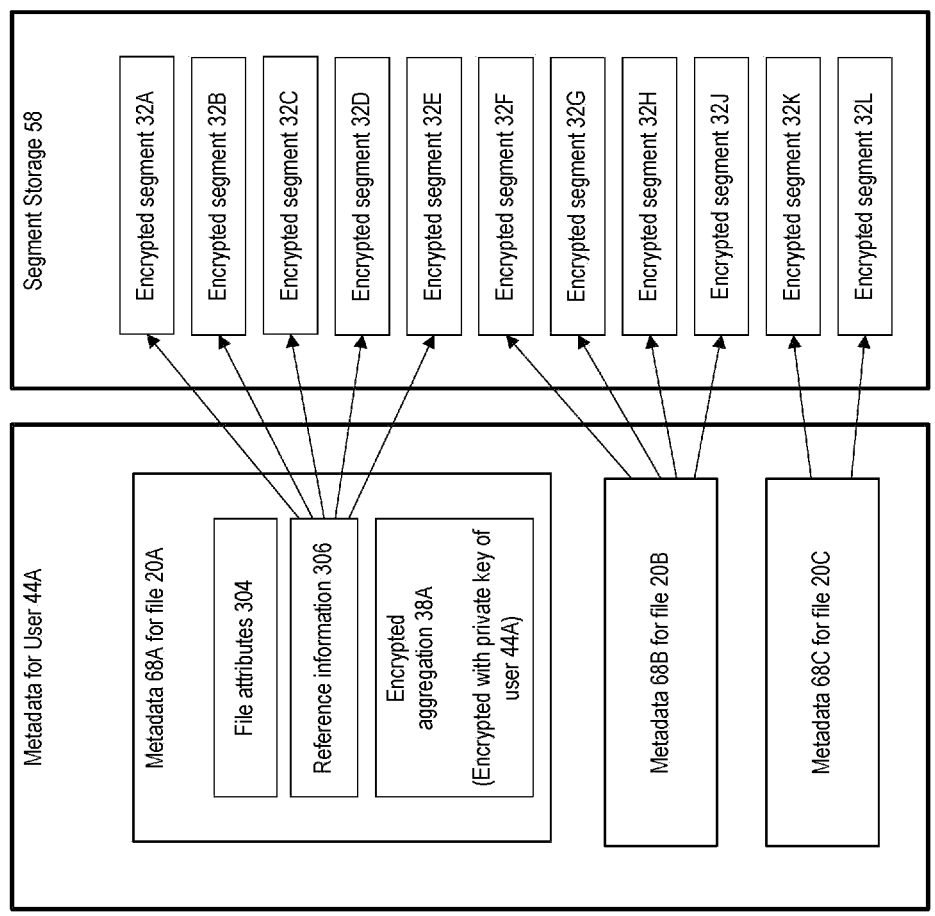
FIG. 3 illustrates an example of the storage pool on the server computer system after a particular file has been backed up from a client computer system.

The backup server software 190 executing on the server computer system 10 may store the information received from the client computer system 7A in the storage pool 50. FIG. 3 illustrates an example of the storage pool 50 after the information has been stored according to one embodiment. The storage pool 50 may include a segment storage area or database 58 in which the encrypted segments 32A-32E have been stored. The storage pool 50 may also include metadata representing files owned by the user 44A which have been backed up to the server computer system 10. In some embodiments the metadata for the user 44A's files may be stored in a separate storage area or database allocated to the user 44A. In other embodiments the metadata for the user 44A's files may be stored together with metadata for other users' files, and each portion of metadata may simply identify the respective user 44 to which the metadata corresponds.

As shown in FIG. 3, the backup server software 190 has stored metadata 68A corresponding to the file 20A in the storage pool 50. The metadata 68A includes reference information 306 which specifies or references the encrypted segments 32A-32E which include the data for the file 20A (in encrypted form). The metadata 68A also includes the encrypted aggregation 38A which is encrypted with the private key of the user 44A and includes the content-based keys that were used to encrypt the segments of the file. The metadata 68A may also include other information, such as file attributes 304 for the file 20A received from the client computer system 7A (e.g., file pathname, last modification time, etc.).

In this example, other file metadata 68B and 68C representing other files 20B and 20C owned by the user 44A has also been stored. (The details of the metadata 68B and 68C is not shown.) Other encrypted segments 32F-32L referenced by the metadata 68B and 68C have also been stored in the segment storage area 58. For example, the metadata 68B and 68C and the encrypted segments 32F-32L may have previously been stored when the files 20B and 20C were previously backed up from the client computer 7A to the server computer system 10.

Suppose now that another user 44B of another client computer system 7B has a file 20D which is an identical copy of the file 20A. (The file attributes of the file 20D, such as the pathname, creation time, etc., may be different than those of the file 20A, but the actual data contents of the two files are the same.) Backup client software 180 executing on the client computer system 7B may perform the algorithm described above with reference to FIG. 2 to backup the file 20D to the server computer system 10. The file 20D may be split into the same file segments 22A-22E as were produced on the client computer system 7A. The same content-based keys 30A-30E may be generated from the file segments 22A-22E, and the same encrypted file segments 32A-32E may be produced from the file segments 22A-22E using the content-based keys 30A-30E.

The backup client software executing on the client computer system 7B may also produce the same aggregation 36 including the content-based keys 30A-30E. However, instead of encrypting the aggregation 36 with the private key of the user 44A, the backup client software 180 executing on the client computer system 7B may encrypt the aggregation 36 with a private key of the user 44B, which results in an encrypted aggregation 38B which is different than the encrypted aggregation 38A.

In some embodiments the backup client software 180 on the client computer system 7B may first communicate with the backup server software to determine whether the encrypted segments 32A-32E are already stored in the storage pool 50 before transmitting the encrypted segments 32 to the server computer system 10. If a given encrypted segment 32 is already stored in the storage pool 50 then the encrypted segment 32 may not be transmitted to the server computer system 10. Thus, in this example, since all of the encrypted segments 32A-32E were previously stored in the storage pool 50 when the file 20A was backed up from the client computer system 7A, the encrypted segments 32A-32E may not be transmitted. (The backup client software 180 on the client computer system 7A may also check first to determine whether the encrypted segments 32A-32E need to be transmitted to the server computer system 10 when backing up the file 20A.) The backup client software 180 on the client computer system 7B may still transmit the encrypted aggregation 38B and the file attributes of the file 20B to the server computer system 10.

Figure 4:
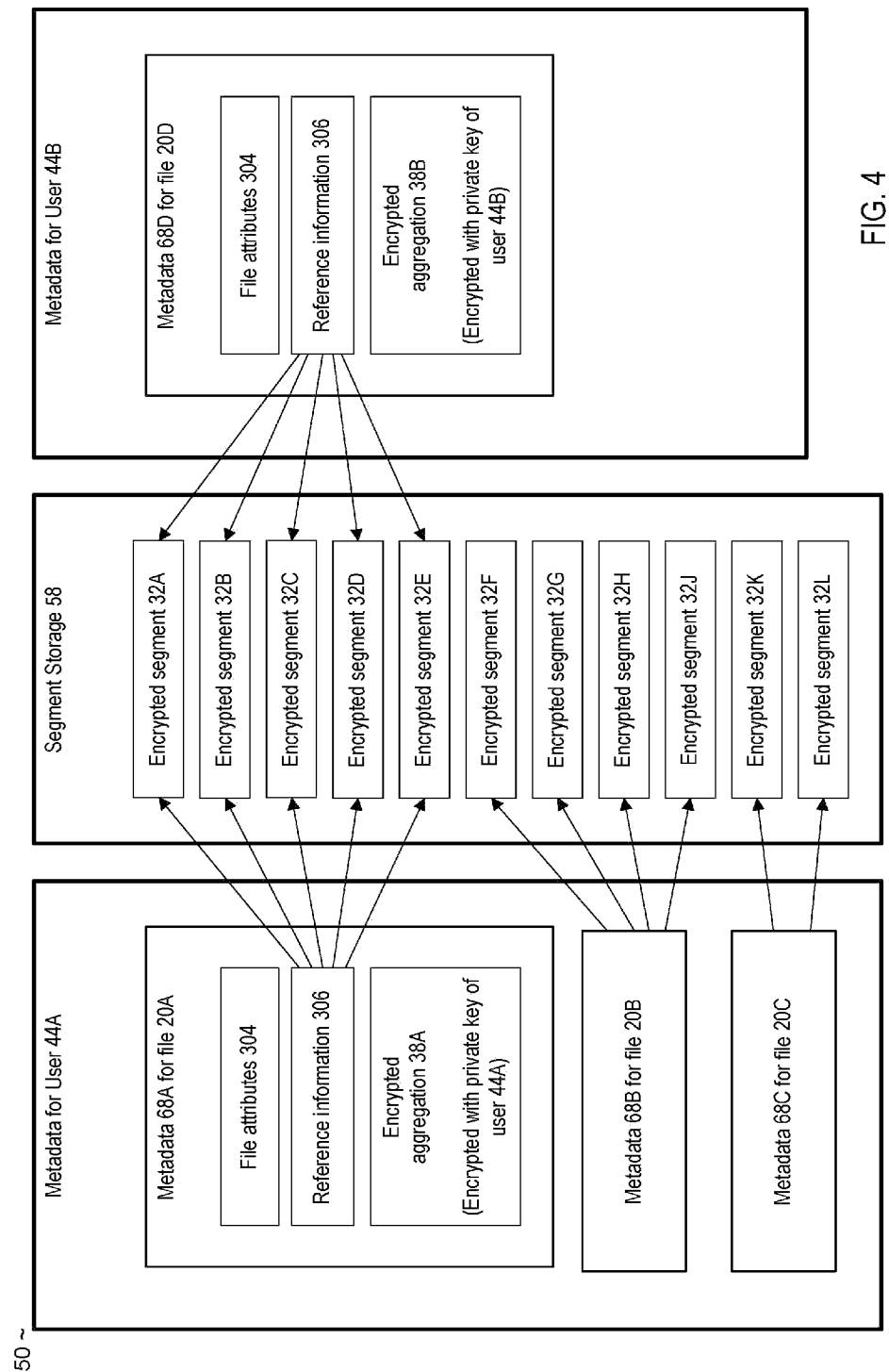
FIG. 4 illustrates the storage pool on the server computer system after another copy of the particular file has been backed up from another client computer system.

In response, the server computer system 10 may store metadata 68D for the file 20D in association with the user 44B, as illustrated in FIG. 4. The reference information 306 of the metadata 68D references the same encrypted segments 32A-32E previously stored in the segment storage area 58 when the file 20A was backed up from the client computer system 7A. The metadata 68D also includes the encrypted aggregation 38B which is encrypted with the private key of the user 44B and the file attributes 304 of the file 20D received from the client computer system 7B.

Thus, the system may be configured to perform de-duplication on the basis of file segments so that there is only a single instance of each unique file segment. In some systems, splitting files into multiple segments and backing the files up on the basis of their individual segments may increase the storage efficiency of the storage pool 50 since different files may not be exactly identical but may contain some segments in common with each other. Furthermore, each file segment may be stored in an encrypted form to protect against unauthorized access to the files.

Referring again to arrow 3A of FIG. 2 where the segments 22 are encrypted, it is noted that the content-based keys 30 may be used in any desired encryption algorithm in order to produce the encrypted segments 32. In some embodiments the content-based keys 30 may be used in a symmetrical encryption scheme where the same content-based key used to encrypt each respective segment will later be used to decrypt the respective segment. In other embodiments the content-based keys 30 may be used in an asymmetrical encryption scheme. For example, the backup client software 180 may generate a public/private key pair for each segment based on the content of the segment. For each segment, the public key of the key pair generated for the segment may be used to encrypt the segment and may then be discarded. The private keys for all of the key pairs for the segments may be included in the aggregation 36.

Figure 5:
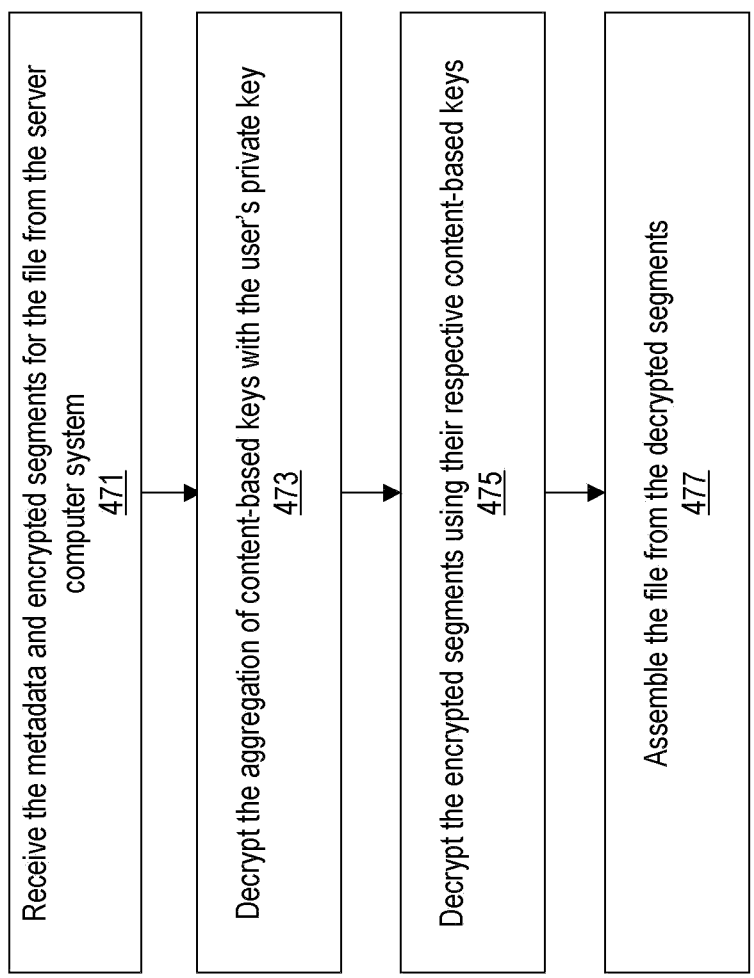
FIG. 5 is a flowchart diagram illustrating one embodiment of a method for restoring a file from the server computer system to a client computer system.

FIG. 5 is a flowchart diagram illustrating one embodiment of a method for restoring a file from the server computer system 10 to a client computer system 7. For example, the backup client software 180 executing on the client computer 7A may perform the method to restore the file 20A.

As indicated in 471, the backup client software 180 executing on the client computer 7A may communicate with the backup server software to receive the metadata 68A and the encrypted segments 32A-32E for the file 20A from the server computer system 10. The metadata 68A may include the encrypted aggregation 38A.

As indicated in 473, the backup client software 180 may decrypt the encrypted aggregation 38A using the private key of the user 44A to produce the unencrypted aggregation 36. The content-based keys that were used to generate the encrypted segments 32A-32E may then be retrieved from the aggregation 36. For example, if the aggregation was produced by concatenating the content-based keys for the respective file segments then the backup client software 180 may split the concatenation 36 to obtain the individual content-based keys 30A-30E.

As indicated in 475, the backup client software 180 may decrypt the encrypted segments 32 using their respective content-based keys 30 to produce the original file segments 22.

As indicated in 477, the backup client software 180 may then assemble the file from the decrypted segments 22, e.g., by appending the data from each segment into a single file having data identical to the original file 20A.

Thus, the method enables the backup client software 180 executing on behalf of the user 44A to restore the file 20A using the private key of the user 44A. However, other users 44 or unauthorized software do not possess the private key of the user 44A, and thus may not be able to restore and access the file 20A using the metadata 68A stored on the server computer system 10. Similarly, the backup client software executing on behalf of the user 44B, can restore the file 20D using the private key of the user 44B, but other users 44 and unauthorized software do not possess the private key of the user 44B.

As described above, since the keys used to encrypt the segments for a file are derived from the content of the segments themselves, the backup client software 180 for each user having a copy of the file will produce identical encrypted segments, which enables de-duplication of the encrypted segments on the server computer system 10. Since the segment keys produced for all the users are the same, the aggregation 36 of the segments keys may also be the same. However, in the embodiments described above, the aggregation 36 is encrypted with the private key of each user 44, which results in different encrypted aggregations 38. For example, the aggregation 36 created by the client computer 7A is encrypted with the private key of the user 44A to produce the encrypted aggregation 38A, and the aggregation 36 created by the client computer 7B is encrypted with the private key of the user 44B to produce a different encrypted aggregation 38B. Thus, although the underlying segment keys are the same, the segment keys are effectively duplicated on the server computer system 10 for each copy of the file.

Figure 6:
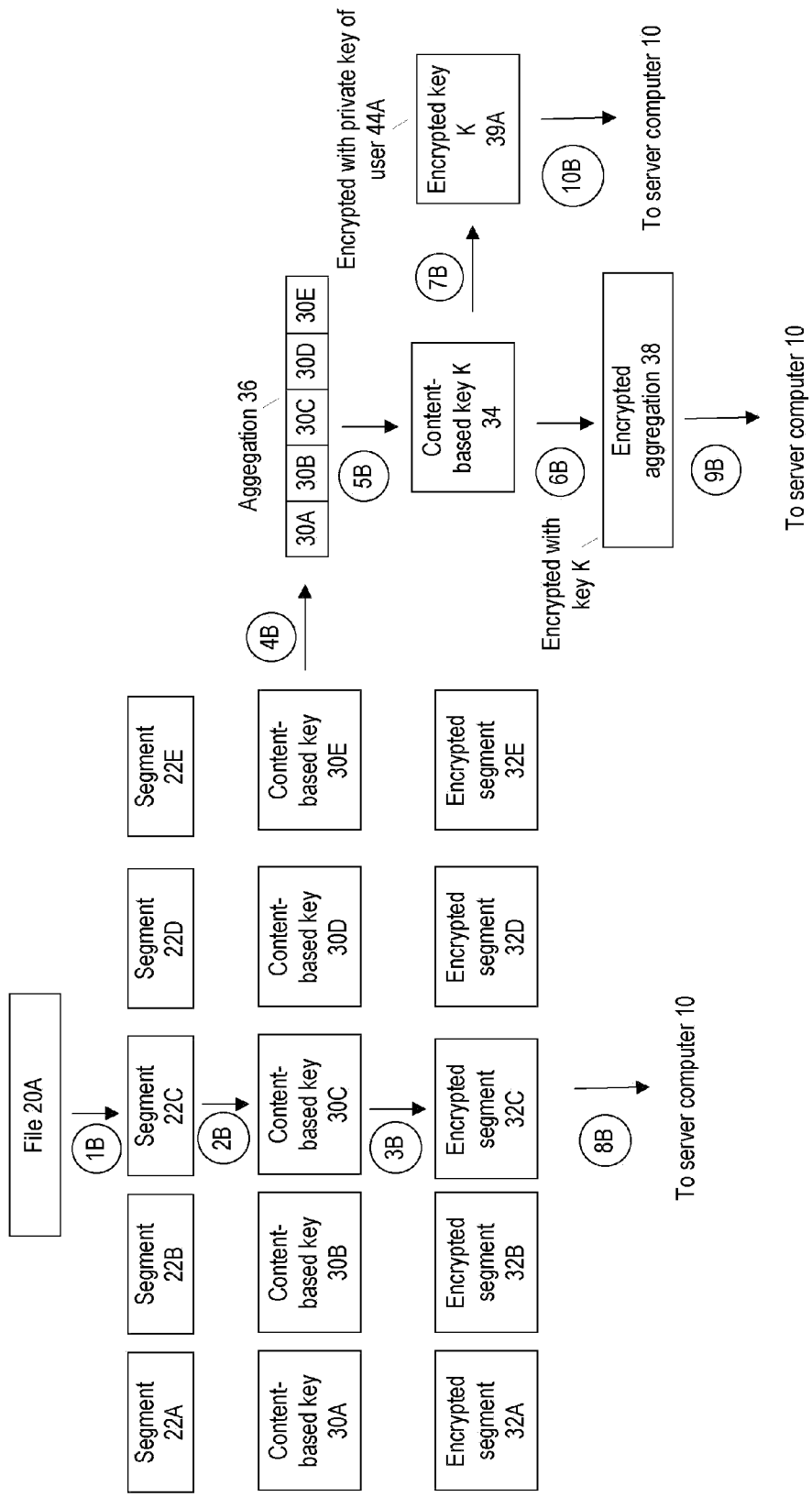
FIG. 6 illustrates an alternative embodiment of an algorithm for backing up a file from a client computer system to the server computer system.

Further embodiments of the method may eliminate this duplication of the segment keys on the server computer system 10. For example, FIG. 6 illustrates an alternative embodiment of a method for backing up the file 20A owned by the user 44A.

As indicated by arrows 1B and 2B, the backup client software 180B executing on the client computer 7A may split the file 20A into a plurality of segments 22A-22E and generate a respective content-based key 30 for each of the segments 22, similarly as described above. As indicated by the arrow 3B, the backup client software 180 may encrypt each respective segment 22 using the respective content-based key 30 for the respective segment 22, to produce the same encrypted segments 32A-32E as previously described above.

As indicated by the arrow 4B, the backup client software may also concatenate the content-based keys 30 to produce a concatenation 36, e.g., by appending the bits of the respective keys 30 to produce a single series of bits that includes all the bits of the individual keys 30. In other embodiments the backup client software may produce an aggregation of the content-based keys 30 in any of various ways other than concatenation. An aggregation of the content-based keys 30 may include any information which includes the content-based keys 30.

The backup client software 180 may also aggregate the content-based keys 30 to produce the same aggregation 36 as described above. However, instead of encrypting the aggregation 36 with the private key of the user 44A, the backup client software 180 instead generates a content-based key "K" 34 from the aggregation 36, as indicated by the arrow 5B. For example, in some embodiments the key "K" may be derived using the bits of the aggregation 36, e.g., using the same algorithm or a similar algorithm as the one used to derive the content-based keys 30 from the segments 22.

As indicated by the arrow 6B, the backup client software 180 may then encrypt the aggregation 36 using the derived key "K" 34, which results in the encrypted aggregation 38.

As indicated by the arrow 7B, the backup client software 180 may also encrypt the key "K" 34 with the private key of the user 44A, which results in the encrypted key "K" 39A. Thus, other users 44 or other software programs not controlled by or authorized by the user 44A may not be able to decrypt the encrypted key "K" 39A since they do not have the private key of the user 44A.

As indicated by the arrows 8B, 9B, and 10B, the backup client software 180 executing on the client computer system 7A may communicate with backup server software executing on the server computer system 10 to transmit the encrypted segments 32, the encrypted aggregation 38, and the encrypted key "K" 39A to the server computer system 10. The backup client software may also transmit other file attributes regarding the file 20A to the server computer system 10, e.g., file system attributes of the file 20A, such as its pathname, creation time, last modification time, etc.

The backup client software 180 executing on the client computer 7B may backup the identical file 20D in a similar manner. Since the aggregation 36 produced on the client computer 7B is the same as the aggregation 36 produced on the client computer 7A, the key "K" derived from the aggregation 36 will be the same in both cases. Thus, the encrypted aggregation 38 will also be the same in both cases since the same key "K" is used on both the client computer 7A and the client computer 7B to create the encrypted aggregation 38. However, in this case the key "K" derived from the aggregation 36 is encrypted with the private key of the user 44B to produce an encrypted key 39B.

Figure 7A:
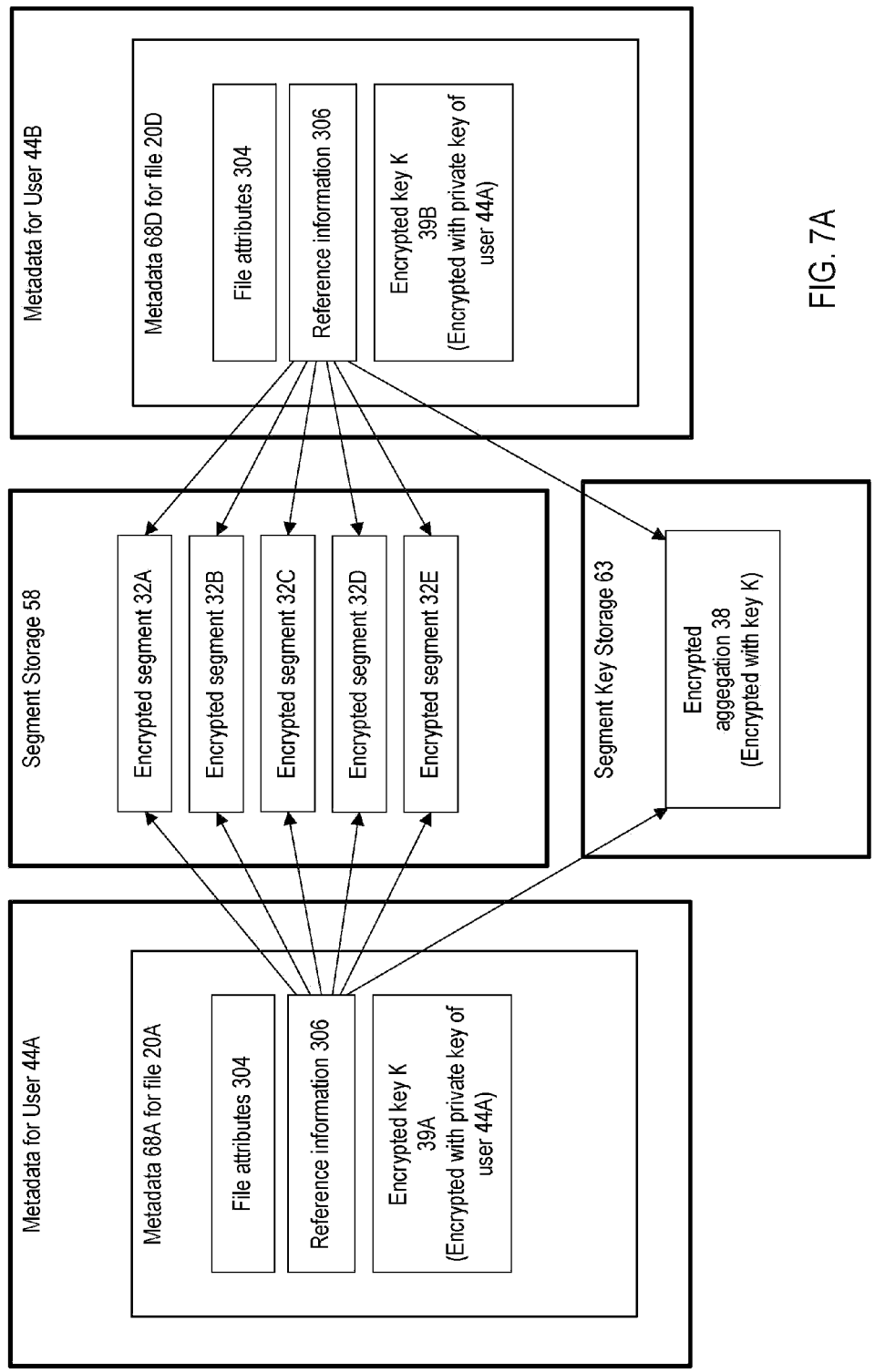
FIGS. 7A and 7B illustrate an example of the storage pool on the server computer system after two copies of a particular file have been backed up from two different client computer systems according to the method of FIG. 6.

The backup server software executing on the server computer system 10 may store the information received from the client computer system 7A and the client computer system 7B in the storage pool 50. FIG. 7 illustrates an example of the storage pool 50 after the information has been stored according to one embodiment. The storage pool 50 may include a segment storage area or database 58 in which the encrypted segments 32A-32E have been stored, similarly as described above. In this example, the storage pool 50 also includes a segment key storage area or database 63 in which the encrypted aggregation 38 has been stored. The reference information 306 in the metadata 68A for the file 20A and the reference information 306 in the metadata 68D for the file 20D both reference the same instances of the encrypted segments 32A-32E, and also reference the same encrypted aggregation 38.

The metadata 68A for the file 20A includes the encrypted key "K" 39A, i.e., the version of the key "K" encrypted with the private key of the user 44A. Similarly, the metadata 68D for the file 20D includes the encrypted key "K" 39B, i.e., the version of the key "K" encrypted with the private key of the user 44B.

Thus, in this embodiment a single encrypted instance of the segment keys is stored and referenced for each copy of the file, which enables duplication of the segment keys to be avoided. The key "K" is needed to decrypt the encrypted aggregation 38, and the private key of the user 44A or 44B is needed to obtain the key "K" since the key "K" is encrypted.

Figure 7B:
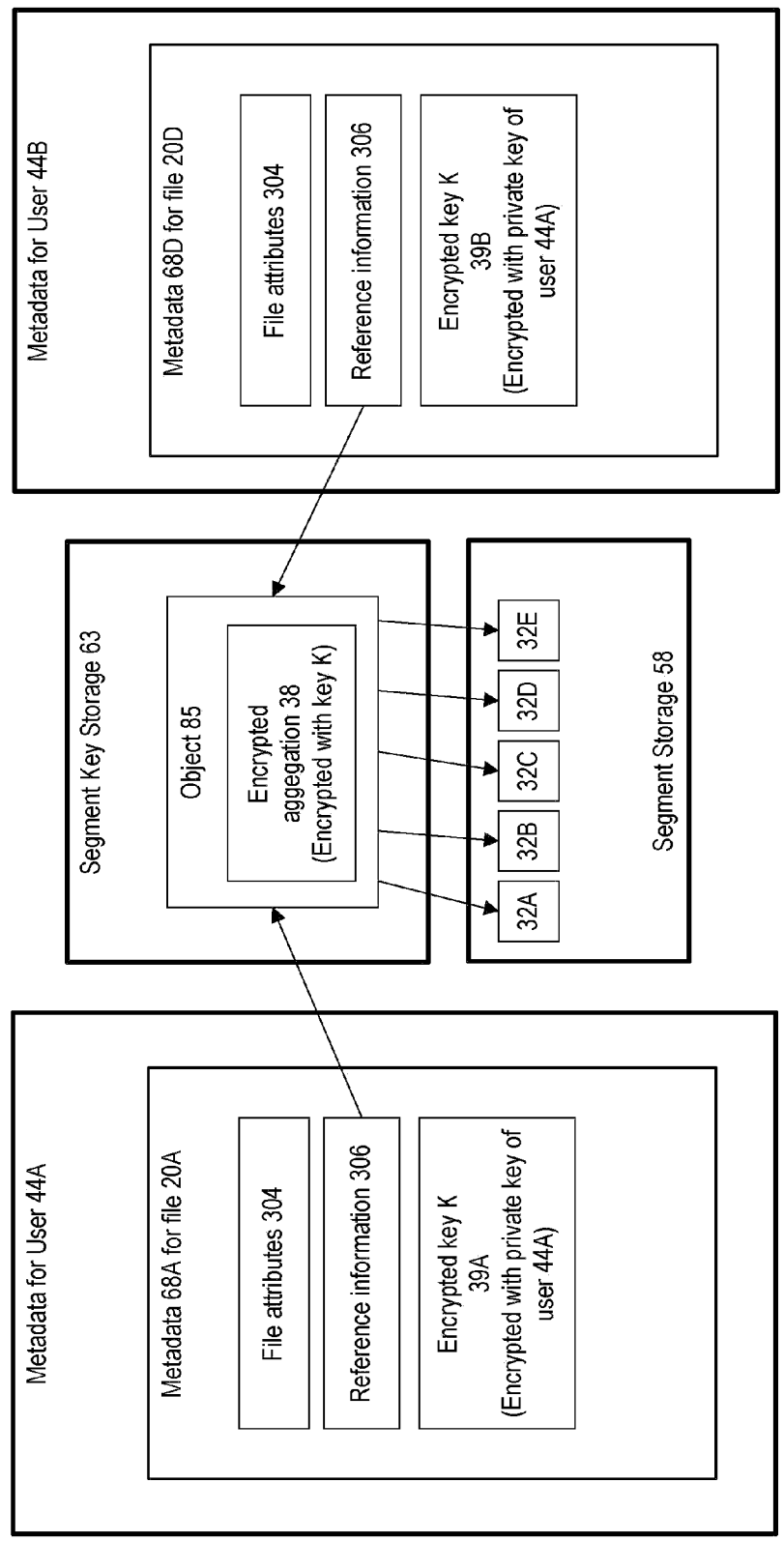

FIG. 7B illustrates an alternative embodiment of the storage pool 50 after the server computer system 10 has stored the information received from the client computer system 7A and the client computer system 7B. The storage pool 50 again includes a segment storage area or database 58 in which the encrypted segments 32A-32E have been stored. The storage pool 50 also includes a segment key storage area or database 63 in which the encrypted aggregation 38 has been stored. However, in this example the encrypted aggregation 38 has been stored within an object 85. The reference information 306 in both the metadata 68A and the metadata 68D reference the same object 85, and the object 85 references the same instances of the encrypted segments 32A-32E. This embodiment eliminates the duplicate references to all of the encrypted segments in the metadata 68A and the metadata 68D, which may further aid in the de-duplication of data performed by the server computer system 10. The encrypted segments are referenced only once by the object 85. It is noted that in other embodiments there may be more than one level of indirection. For example, in other embodiments the object 85 may reference another object, which then references the encrypted segments 32A-32E. Also, objects may reference each other recursively which may allow for increased levels of de-duplication and allow the storage pool 50 to scale well as it becomes very large.

Figure 8:
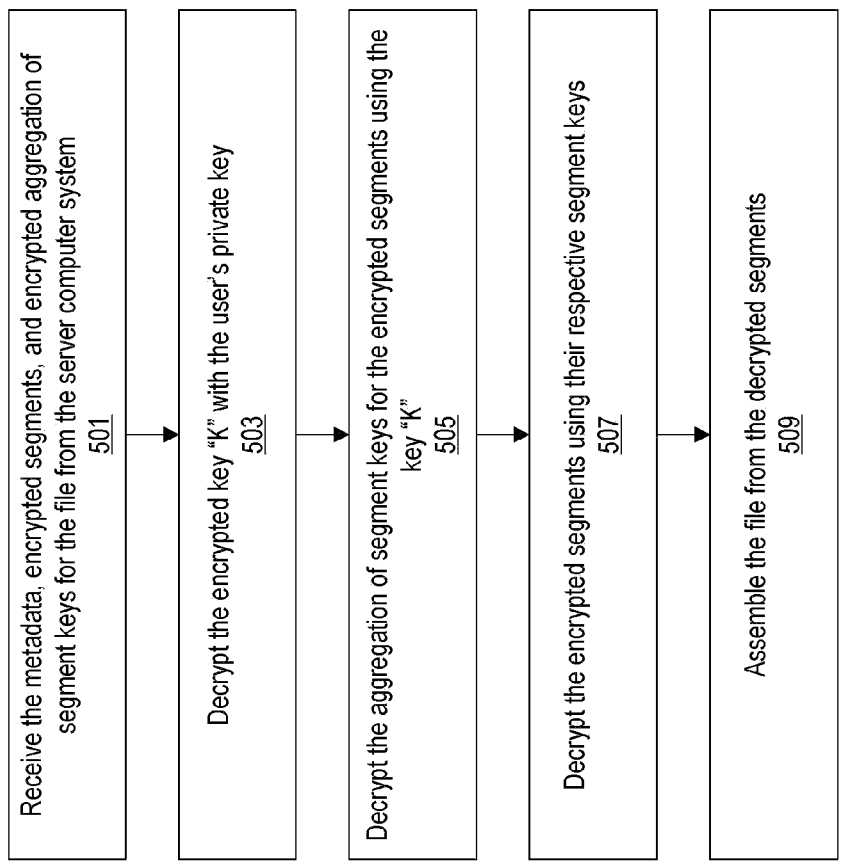
FIG. 8 is a flowchart diagram illustrating an alternative embodiment of a method for restoring a file from the server computer system to a client computer system.

FIG. 8 is a flowchart diagram illustrating one embodiment of a method for restoring a file from the server computer system 10 to a client computer system 7, where the file has been backed up according to the method illustrated in FIG. 6. For example, the backup client software executing on the client computer 7A may perform the method to restore the file 20A.

As indicated in 501, the backup client software 180 executing on the client computer 7A may communicate with the backup server software 190 to receive the metadata 68A, the encrypted segments 32A-32E, and the encrypted aggregation 38 from the server computer system 10. The metadata 68A may include the encrypted key "K" 39A.

As indicated in 503, the backup client software 180 may decrypt the encrypted key "K" 39A included in the metadata 68A using the private key of the user 44A to produce the key "K" 34.

As indicated in 505, the backup client software 180 may decrypt the encrypted aggregation 38 using the key "K" 34 to produce the unencrypted aggregation 36 of the content-based segment keys 30A-30E. The backup client software 180 may then extract the individual content-based segment keys 30A-30E from the aggregation 36.

As indicated in 507, the backup client software 180 may decrypt the encrypted segments 32 using their respective content-based keys 30 to produce the original file segments 22.

As indicated in 509, the backup client software 180 may then assemble the file from the decrypted segments 22, e.g., by appending the data from each segment into a single file having data identical to the original file 20A.

Thus, the method enables the backup client software executing on behalf of the user 44A to restore the file 20A using the private key of the user 44A. However, other users 44 or unauthorized software do not possess the private key of the user 44A, and thus may not be able to restore and access the file 20A. Similarly, the backup client software executing on behalf of the user 44B, can restore the file 20D using the private key of the user 44B, but other users 44 and unauthorized software do not possess the private key of the user 44B.

As noted above, in some embodiments the backup client software 180 on a given client computer system 7 may first communicate with the backup server software 190 to determine whether the encrypted segments for a file are already stored in the storage pool 50 before transmitting the encrypted segments to the server computer system 10. In various embodiments the system may use any of various techniques to determine whether the encrypted segments are already stored in the storage pool 50. In some embodiments, for each of the encrypted segments 32 of the file, the backup client software may perform an algorithm based on the encrypted data of the encrypted segment 32 in order to compute an ID or fingerprint for the encrypted segment 32. The ID or fingerprint may include information useable to identify the encrypted segment 32. For example, in some embodiments a hash function may be applied to the encrypted data of the encrypted segment 32 in order to generate a hash value used as the encrypted segment ID. In other embodiments, any of various other kinds of algorithms may be performed to generate the encrypted segment IDs. In some embodiments the algorithm that is used may have the following properties: 1) For any two encrypted segments that have identical data, the algorithm will generate the same ID for the encrypted segment. 2) For any two encrypted segments that do not have identical data, the algorithm will generate different IDs for the encrypted segment.

Thus, the backup client software 180 may transmit the IDs for the encrypted segments 32 to the server computer system 10. In response, the backup server software 190 on the server computer system 10 may use the IDs to check to see whether copies of the encrypted segments 32 are already stored in the storage pool 50. For example, each encrypted segment in the storage pool 50 may be stored in association with its respective ID. The backup server software may then inform the backup client software 180 of which of the encrypted segments 32 (if any) are already stored in the storage pool 50.

As noted above, in some embodiments the reference information 306 or metadata 68 may indirectly specify the encrypted segments of the file through one or more levels of objects. For example, in some embodiments the server computer system 10 may be configured to use a hierarchy of objects to represent stored files. Representing files using a hierarchy of objects may enable de-duplication techniques to be recursively applied at each level of the hierarchy. In various embodiments there may be any number of recursive levels of de-duplication, and any of various kinds of object hierarchies may be used to represent the files.

In some embodiments the hierarchy of objects may include path objects (POs), data objects (DOs), and segment objects (SOs). Each segment object (SO) includes metadata and content, where the SO is identified by a fingerprint based solely on the content, and the metadata consists of size, checksums, etc.

Each data object (DO) includes metadata and a sequence of tuples, where each tuple specifies metadata and the fingerprint of a DO or SO. The content of the DO (data object) corresponds to the concatenated content of the DOs and SOs in the sequence, and the fingerprint of the DO can be based on the sequence or on the concatenated content.

Each PO includes metadata (path, file attributes, etc.), DO fingerprint of file content, DO fingerprint of file ACL, and DO fingerprint of additional metadata of the file. The ACL is security information associated with the file on the file system.

Thus, these objects represent a hierarchy in which a path object references one or more data objects, where each data object references one or more segment objects and/or one or more other data objects, and where each segment object directly specifies or represents a file segment.

The content of each segment object (SO) may be encrypted using a key K1 derived from the content. Thus, the content of the segment object is stored in encrypted form. The use of a content-derived key to encrypt the segment content may ensure that different data objects which have segments in common will reference the same segment objects, thus achieving deduplication at the segment level.

The sequence of tuples in each data object (DO) may also be encrypted using a key K2 based on the sequence itself. Thus, the sequence of tuples in each data object is also stored in encrypted form. The use of a content-derived key to encrypt the sequence may ensure that different path objects (or other data objects) can reference a single de-duplicated instance of a data object.

Thus, recursive levels of de-duplication may be achieved. For example, multiple path objects (POs) may refer to the same de-duplicated data object (DO), and multiple DOs can refer to the same de-duplicated DO and/or the same de-duplicated SO.

It is noted that information in the path object may be encrypted with the private key of the user who owns the file represented by the path object. Thus, in some embodiments, the objects (POs, DOs, SOs) at each level in the object hierarchy are encrypted, and de-duplication is also achieved at the DO and SO level.

Figure 9:
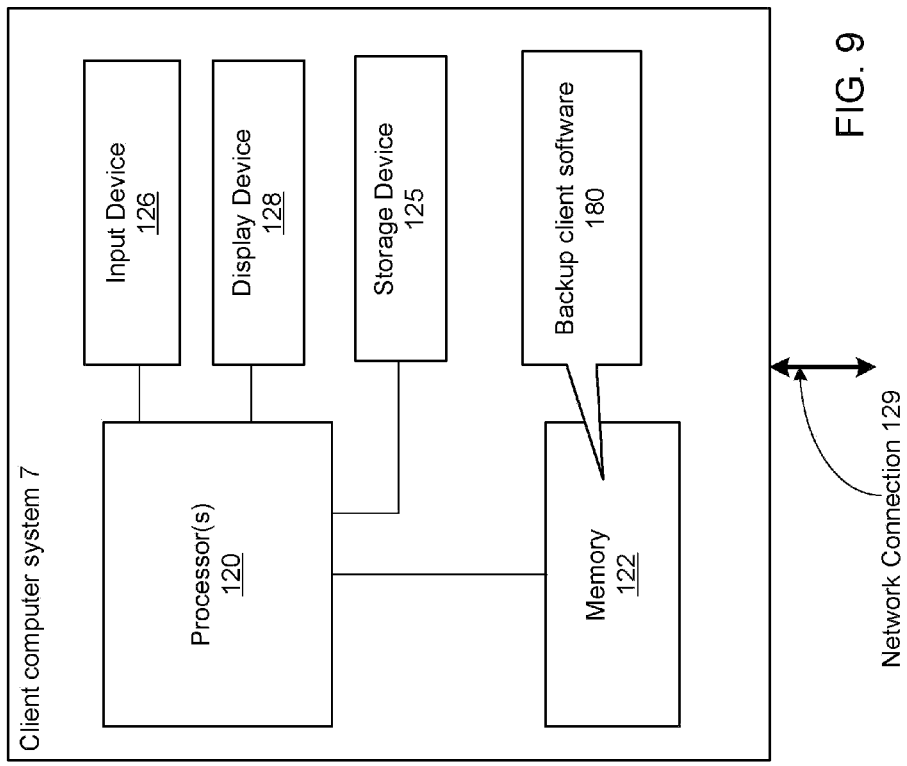
FIG. 9 illustrates an example of a client computer system according to one embodiment.

FIG. 9 illustrates an example of a client computer system 7 according to one embodiment. It is noted that FIG. 9 is provided as an example, and in other embodiments a client computer system 7 may be implemented in various other ways. In some embodiments the client computer system 7 may comprise a computer such as a personal computer system (PC), workstation, portable computer (e.g., laptop or notebook), personal digital assistant (PDA), television system, or other computing device or combination of devices.

The client computer system 7 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may store program instructions and/or data. In particular, the memory 122 may store backup client software 180, which may be executed by the processor(s) 120. The backup client software 180 may be operable to communicate with the backup server software 190 executing on the server computer system 10 in order to backup and restore files according to the methods described herein.

It is noted that the processor 120 is representative of any type of processor. For example, in one embodiment, the processor 120 may be compatible with the x86 architecture, while in another embodiment the processor 120 may be compatible with the SPARC™ family of processors. Also, in some embodiments the client computer system 7 may include multiple processors 120.

The client computer system 7 also includes or is coupled to one or more storage devices 125. Files that are backed up from the client computer system 7 may originally be stored on the storage device(s) 125, e.g., in a file system. In various embodiments the storage devices 125 may include any of various kinds of storage devices operable to store data, such as optical storage devices, hard drives, tape drives, etc. As one example, the storage devices 125 may be implemented as one or more hard disks configured independently or as a disk storage system.

The client computer system 7 may also include one or more input devices 126 for receiving user input from a user of the client computer system 7. The input device(s) 126 may include any of various types of input devices, such as keyboards, keypads, microphones, or pointing devices (e.g., a mouse or trackball). The client computer system 7 may also include one or more output devices 128 for displaying output to the user. The output device(s) 128 may include any of various types of output devices, such as LCD screens or monitors, CRT monitors, etc.

The client computer system 7 may also include network connection hardware 129 through which the client computer system 7 couples to a network enabling communication with the server computer system 10. The network connection 129 may include any type of hardware for coupling the client computer system 7 to a network, e.g., depending on the type of network. In various embodiments, the client computer system 7 may be coupled to the server computer system 10 via any type of network or combination of networks. For example, the network may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer may be coupled to the network using any type of wired or wireless connection medium. For example, wired mediums may include Ethernet, fiber channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

Figure 10:
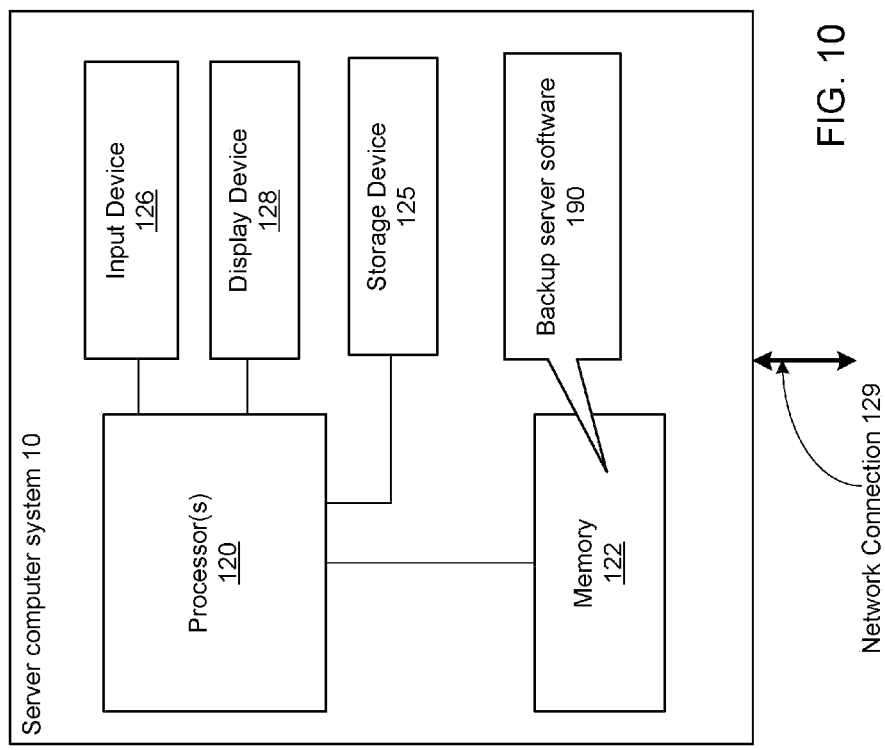
FIG. 10 illustrates an example of the server computer system according to one embodiment.

FIG. 10 illustrates an example of the server computer system 10 according to one embodiment. The server computer system 10 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may store program instructions and/or data. In particular, the memory 122 may store backup server software 190, which may be executed by the processor(s) 120. The backup server software 190 may be operable to communicate with the backup client software 180 executing on the various client computer systems 7 in order to backup files from the client computer systems 7 and restore files to the client computer systems 7 according to the methods described herein. For example, the backup server software 190 may execute to perform operations described above, such as receiving and storing a plurality of encrypted segments of a file and storing metadata for the file in the storage pool 50. The backup server software 190 may also execute to retrieve the encrypted segments and metadata for the file from the storage pool 50 and return them to the backup client software 180 executing on a particular client computer system 7, e.g., in response to a request by the backup client software 180 to restore the file.

The backup server computer system 10 also includes or is coupled to one or more storage devices 125 on which the storage pool 50 is implemented. In various embodiments the storage devices 125 may include any of various kinds of storage devices operable to store data, such as disk drives, optical storage devices, tape drives, etc. As one example, the storage devices 125 may be implemented as one or more hard disks configured independently or as a disk storage system. As another example, the storage devices 125 may be implemented as one or more tape drives. In some embodiments the storage devices 125 may operate in a storage system or library device with which the server computer system 10 communicates via a communication bus or network.

The backup server computer system 10 may also include one or more input devices 126, one or more output devices 128, and network connection hardware 129, similarly as described above with reference to the client computer system 7.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions, stored therein that, when executed by a client computer of a computer system cause the client computer to perform operations including:
   split a file into a plurality of segments;
   encrypt each segment of the plurality of segments to generate a plurality of encrypted segments, wherein each segment of the plurality of segments is encrypted with a respective segment key, wherein the respective segment key corresponding to each segment is derived based on contents of the segment;
   transmit at least one encrypted segment of the plurality of encrypted segments to a server computer included in the computer system for storage in a storage unit included in the server computer in response to a determination that the at least one encrypted segment has not been previously stored in the storage unit;
   generate an encrypted aggregation of the segment keys for the plurality of encrypted segments on the storage unit included in the computer system, wherein the encrypted aggregation is encrypted with a key K, wherein the key K is derived based on contents of the aggregation of the segment keys;
   transmit the encrypted aggregation to the server computer for storage in the storage unit;
   transmit information corresponding to a first copy of the file associated with a first user to the server computer for storage in the storage unit, the information including:
      information specifying each stored encrypted segment of the plurality of encrypted segments;
      information specifying the stored encrypted aggregation of the segment keys for the plurality of encrypted segments;
      a first encrypted version of the key K encrypted with a private key of the first user;
   store information corresponding to a second copy of the file associated with a second user, including:
      information specifying each stored encrypted segment of the plurality of encrypted segments;
      information specifying the stored encrypted aggregation of the segment keys for the plurality of encrypted segments;
      a second encrypted version of the key K encrypted with a private key of the second user.

2. The computer-accessible storage medium of claim 1, wherein the encrypted aggregation of the segment keys for the plurality of encrypted segments comprises an encrypted concatenation of the segment keys for the plurality of encrypted segments.

3. The computer-accessible storage medium of claim 1, wherein the segment key for each respective segment of the plurality of segments includes a respective pair of public/private keys derived based on contents of the segment;
   wherein each respective segment of the plurality of segments is encrypted with the public key of the respective pair of public/private keys generated for the respective segment;
   wherein storing the encrypted aggregation of the segment keys comprises storing an encrypted aggregation of the private keys of the public/private key pairs for the segments.

4. A method comprising:
   splitting a file into a plurality of segments by a client computer included in a computer system;
   encrypting, by the client computer, each segment of the plurality of segments to generate a plurality of encrypted segments, wherein each segment of the plurality of segments is encrypted with a respective segment key, wherein the respective segment key corresponding to each segment is derived based on contents of the segment;
   transmitting at least one encrypted segment of the plurality of encrypted segments to a server computer included in the computer system for storage in a storage unit included in the server computer in response to a determination that the at least one encrypted segment of the plurality of encrypted segments has not been previously stored in the storage unit;
   generating, by the client computer, an encrypted aggregation of the segment keys for the plurality of encrypted segments in a storage unit of the computer system, wherein the encrypted aggregation is encrypted with a key K, wherein the key K is derived based on contents of the aggregation of the segment keys;
   transmitting the encrypted aggregation to the server computer for storage in the storage unit;
   transmitting, by the client computer, information on storage unit of the computer system corresponding to a first copy of the file associated with a first user to the server computer for storage in the storage unit, the information including:
      information specifying each stored encrypted segment of the plurality of encrypted segments;
      information specifying the stored encrypted aggregation of the segment keys for the plurality of encrypted segments;
      a first encrypted version of the key K encrypted with a private key of the first user;
   storing information on the computer system corresponding to a second copy of the file associated with a second user, including:
      information specifying each stored encrypted segment of the plurality of encrypted segments;
      information specifying the stored encrypted aggregation of the segment keys for the plurality of encrypted segments;
      a second encrypted version of the key K encrypted with a private key of the second user.

5. The method of claim 4, further comprising:
   receiving the plurality of encrypted segments of the file from a first client computer;

receiving the first encrypted version of the key K from the first client computer; and receiving the second encrypted version of the key K from a second client computer.

6. The method of claim 5, further comprising:

in response to communication with the second client computer, determining that the plurality of encrypted segments of the file have already been stored; and transmitting information to the second client computer indicating that the plurality of encrypted segments of the file have already been stored.

7. The method of claim 4, wherein said storing the information corresponding to the first copy of the file comprises:

storing a plurality of objects, wherein the plurality of objects includes a first object and a second object, wherein the first object specifies the second object, wherein the second object specifies a first stored encrypted segment of the plurality of encrypted segments.

8. A system comprising:

one or more storage units;

a server computer;

one or more client computers, and memory storing program instructions, wherein the program instructions are executable by the one or more hardware processors to:

split a file into a plurality of segments;

encrypt each segment of the plurality of segments to generate a plurality of encrypted segments, wherein each segment of the plurality of segments is encrypted with a respective segment key, wherein the respective segment key corresponding to each segment is derived based on contents of the segment;

transmit at least one encrypted segments of the plurality of encrypted segments to the server computer for storage in a given one of the one or more storage units in response to a determination that the at least one encrypted segment has not been previously stored in the storage unit;

generate an encrypted aggregation of the segment keys for the plurality of encrypted segments in a second one of the one or more storage units, wherein the encrypted aggregation is encrypted with a key K, wherein the key K is derived based on contents of the aggregation of the segment keys;

transmit the encrypted aggregation to the server computer for storage in the given one of the one or more storage units;

transmit information corresponding to a first copy of the file associated with a first user to the server computer for storage in the given one of the one or more storage units, the information including:

information specifying each stored encrypted segment of the plurality of encrypted segments;

information specifying the stored encrypted aggregation of the segment keys for the plurality of encrypted segments;

a first encrypted version of the key K encrypted with a private key of the first user;

store information corresponding to a second copy of the file associated with a second user, including:

information specifying each stored encrypted segment of the plurality of encrypted segments;

information specifying the stored encrypted aggregation of the segment keys for the plurality of encrypted segments;

a second encrypted version of the key K encrypted with a private key of the second user.

* * * * *